(12) United States Patent
Joyce et al.

(10) Patent No.: US 8,131,743 B1
(45) Date of Patent: Mar. 6, 2012

(54) OBJECT SEARCHING IN DATA STORAGE SYSTEMS

(75) Inventors: Scott Joyce, Foxboro, MA (US); Thiago daSilva, Westborough, MA (US); Munish Desai, Shrewsbury, MA (US); Neil Schutzman, Marlborough, MA (US); Keith Sutton, Blackstone, MA (US)

(73) Assignee: EMC Corporation, Hopkinton, MA (US)

(*) Notice: Subject to any disclaimer, the term of this patent is extended or adjusted under 35 U.S.C. 154(b) by 353 days.

(21) Appl. No.: 12/493,883

(22) Filed: Jun. 29, 2009

(51) Int. Cl.
*G06F 7/00* (2006.01)

(52) U.S. Cl. ......................................... 707/759; 707/769

(58) Field of Classification Search .................. 707/705, 707/706, 759, 769
See application file for complete search history.

(56) References Cited

U.S. PATENT DOCUMENTS

| | | | |
|---|---|---|---|
| 6,571,282 B1 | 5/2003 | Bowman-Amuah | |
| 7,383,552 B2 | 6/2008 | Hudis et al. | |
| 7,502,669 B1 | 3/2009 | Evans et al. | |
| 7,529,734 B2* | 5/2009 | Dirisala | ............................ 707/3 |
| 7,634,496 B1 | 12/2009 | Evans | |
| 7,653,652 B2 | 1/2010 | Kagalwala et al. | |
| 7,685,561 B2 | 3/2010 | Deem et al. | |
| 7,739,688 B1 | 6/2010 | Evans | |
| 2003/0095145 A1 | 5/2003 | Patrizio et al. | |
| 2004/0083274 A1* | 4/2004 | Katiyar et al. | ................ 709/217 |
| 2005/0114318 A1* | 5/2005 | Dettinger et al. | ................. 707/3 |
| 2007/0266369 A1 | 11/2007 | Guan et al. | |
| 2007/0299951 A1 | 12/2007 | Krithivas | |
| 2008/0027788 A1* | 1/2008 | Lawrence et al. | ................ 705/10 |
| 2010/0082656 A1* | 4/2010 | Jing et al. | ...................... 707/760 |

OTHER PUBLICATIONS

"CQL Contextual Query Language (SRU Version 1.2 Specifications)." Aug. 22, 2008. http://www.loc.gov/ standards/sru/specs/cql.html, visited on Jun. 8, 2009.
Scott Joyce, et al. "Converting CQL Query Results Into User-Controllable Objects," U.S. Appl. No. 12/493,876, filed Jun. 29, 2009.

* cited by examiner

*Primary Examiner* — Amy Ng
(74) *Attorney, Agent, or Firm* — BainwoodHuang

(57) ABSTRACT

The method of object searching in a data storage system includes receiving, by an object search machine, a search criteria, the search criteria including a plurality of parameters and storing, by the object search machine, the search criteria as a persistence query having a first query format. The method also includes creating, by the object search machine, a protocol query based upon the persistence query, the protocol query having a second query format, the second query format distinct from the first query format. The method additionally includes utilizing, by the object search machine, the protocol query to request at least one object associated with the protocol query from the data storage system.

20 Claims, 8 Drawing Sheets

```xml
<?xml version="1.0" ?>
<Query>
<Description>LUN_QUERY_NAME_DESCRIPTION</Description>
<Name>LUN_QUERY_NAME</Name>
<Id>advanced_lun_query</Id>
<Type>ADV_QUERY</Type>
...
<Select>
<Display>false</Display>
<PropertyKey>OBJECTPATH(EV_LUN) AS InstanceName</PropertyKey>
</Select>
...
<From>
<Display>true</Display>
<TargetKey>EV_LUN</TargetKey>
</From>
<From>
<Display>false</Display>
<TargetKey>EV_Subsystem</TargetKey>
</From>
...
<Where display="true"
xsi:type="java:com.emc.navisphere.gui.jnfx.search.JNfxQueryCriteria">
<operator>
<display-value>EQUALS_OPERATOR</display-value>
<backend-value>=</backend-value>
</operator>
<obj-param system-display="true">
<display-name>RAID Type</display-name>
<property-name>EV_LUN.RAIDType</property-name>
<property-type>String</property-type>
<value>
<display-value xsi:type="java:java.lang.String">RAID 5</display-value>
<backend-value xsi:type="java:java.lang.String">RAID 5</backend-value>
</value>
<criteria>EV_LUN.RAIDType = 'RAID 5'</criteria>
<id />
</Where>
...
</Query>
```

Fig. 4

```
...
  <Where display="true"              ┌─ 96
xsi:type="java:com.emc.navisphere.gui.jnfx.search.JNfxQueryCriteria">
  <operator>
  <display-value>EQUALS_OPERATOR</display-value>
  <backend-value>=</backend-value>
  </operator>
  <obj-param system-display="true">   ┌─ 96
  <display-name>RAID Type</display-name>
  <property-name>EV_LUN.RAIDType</property-name>
  <property-type>String</property-type>
  <value>                                ┌─ 96
  <display-value xsi:type="java:java.lang.String">RAID 5</display-value>
  <backend-value xsi:type="java:java.lang.String">RAID 5</backend-value>
  </value>
  <criteria>EV_LUN.RAIDType = 'RAID 5'</criteria>
  <id />
  </Where>
  <Where display="true"              ┌─ 96
xsi:type="java:com.emc.navisphere.gui.jnfx.search.JNfxQueryCriteria">
  <operator>
  <display-value>EQUALS_OPERATOR</display-value>
  <backend-value>=</backend-value>
  </operator>
  <obj-param system-display="true">   ┌─ 96
  <display-name>Current Owner</display-name>
  <property-name>EV_LUN.CurrentOwner</property-name>
  <property-type>String</property-type>
  <value>                                ┌─ 96
  <display-value xsi:type="java:java.lang.String">SPB</display-value>
  <backend-value xsi:type="java:java.lang.String">SPB</backend-value>
  </value>
  <criteria>EV_LUN.RAIDType = 'SPB'</criteria>
  <id />
  </Where>
  <Where display="true"              ┌─ 96
xsi:type="java:com.emc.navisphere.gui.jnfx.search.JNfxQueryCriteria">
  <operator>
  <display-value>EQUALS_OPERATOR</display-value>
  <backend-value>=</backend-value>
  </operator>
  <obj-param system-display="true">   ┌─ 96
  <display-name>isFaulted</display-name>
  <property-name>EV_LUN.IsFaulted</property-name>
  <property-type>String</property-type>
  <value>                                ┌─ 96
  <display-value xsi:type="java:java.lang.String">false</display-value>
  <backend-value xsi:type="java:java.lang.String">false</backend-value>
  </value>
  <criteria>EV_LUN.RAIDType = 'false'</criteria>
  <id />
  </Where>
...
```

(bracket 102 encompasses the whole block)

Fig. 5

```
...
<Select>
<Display>false</Display>                    ⎫ 80
<PropertyKey>OBJECTPATH(EV_LUN) AS InstanceName</PropertyKey>
</Select>
<Select>
<Display>true</Display>                     ⎫ 80
<PropertyKey>EV_LUN.Name</PropertyKey>
</Select>
<Select>
<Display>true</Display>                     ⎫ 80
<PropertyKey>EV_LUN.LUNNumber</PropertyKey>
</Select>
<Select>
<Display>true</Display>                     ⎫ 80
<PropertyKey>EV_LUN.RAIDType</PropertyKey>
</Select>
<Select>
<Display>true</Display>                     ⎫ 80
<PropertyKey>EV_LUN.Capacity</PropertyKey>
</Select>
<Select>
<Display>true</Display>                     ⎫ 80
<PropertyKey>EV_LUN.CurrentOwner</PropertyKey>
</Select>
<Select>
<Display>true</Display>                     ⎫ 80
<PropertyKey>EV_LUN.DefaultOwner</PropertyKey>
</Select>
<Select>
<Display>true</Display>                     ⎫ 80
<PropertyKey>EV_LUN.IsFaulted</PropertyKey>
</Select>
<Select>
<Display>true</Display>                     ⎫ 80
<PropertyKey>EV_Subsystem.Name</PropertyKey>
</Select>
...
```

Fig. 6

```xml
<?xml version="1.0" ?>
...

<MULTIREQ>
<SIMPLEREQ>
<IMETHODCALL NAME="ExecuteQuery" >
<LOCALNAMESPACEPATH>

<NAMESPACE NAME=    />
...
</LOCALNAMESPACEPATH>

<IPARAMVALUE NAME="QueryLanguage"><VALUE>CQL</VALUE></
IPARAMVALUE>

<IPARAMVALUE NAME="Query">
<VALUE>

SELECT OBJECTPATH(EV_LUN), EV_LUN.Name,
EV_LUN.LUNNumber, EV_LUN.RAIDType, EV_LUN.Capacity,
EV_LUN.CurrentOwner, EV_LUN.DefaultOwner, EV_LUN.IsFaulted,
EV_Subsystem.Name FROM DiskDevice, RAIDGroup WHERE EV_LUN.RAIDType = "RAID 5" AND
      EV_LUN.CurrentOwner = "SPB" AND
      EV_LUN.IsFaulted = False

</VALUE>
</IPARAMVALUE>

</IMETHODCALL></SIMPLEREQ></MULTIREQ>
...
```

OBJECT SEARCHING IN DATA STORAGE SYSTEMS

BACKGROUND

Certain conventional data storage systems use the Common Information Model (CIM) to represent elements of a data storage system (e.g., disks, logical unit numbers (LUNs), RAID groups, subsystems, etc.) as objects. These data storage systems are managed remotely by a conventional client application running on a conventional client system across a network. During operation, a user running the conventional client application on the conventional client system can conduct a search for specific CIM objects.

In order for a conventional client to obtain search results, a search request may be manually entered by the conventional client in the form of the CIM Query Language (CQL). The CQL search request is forwarded to the conventional data storage system which conducts the search for specific CIM objects. The conventional client then receives the search results in the form of a table containing data about the desired objects from the conventional data storage system.

SUMMARY

Unfortunately there are deficiencies to the above-described conventional approaches to searching for objects in a data storage system. For example, every time a user conducts an object search, the user must enter an entire CQL search request regardless of whether similar or identical searches have previously been conducted by the user. In certain cases, CQL search requests can be very long and cumbersome to enter. Consequently, it can be very time consuming for a user to have to enter the CQL search request every time a search of objects is conducted.

In contrast to the above-identified conventional approaches to searching for objects in a data storage system, an improved object searching technique relates to saving object search requests in a format that allows information of the object search requests to be used quickly and efficiently in future object searches. For example, an object search machine can receive a set of parameters that describe the characteristics of objects to be searched. The object search machine can then save this set of parameters using a format that stores each parameter as a separate entity. Every time an object search that is the same as or similar to an object search described by the stored set of parameters is to be conducted, the object search machine recalls the set of parameters without the need for manually reentering of parameters. Since the object search machine stores each parameter as a separate entity, the object search machine can quickly and efficiently populate its parameter fields with this data. The object search machine can then execute the object search by forwarding the search request to the data storage system in a different format (i.e., a format that is required by the data storage system).

One embodiment is directed to a method of object searching in a data storage system. The method includes receiving, by an object search machine, a search criteria, the search criteria including a plurality of parameters and storing, by the object search machine, the search criteria as a persistence query having a first query format. The method also includes creating, by the object search machine, a protocol query based upon the persistence query, the protocol query having a second query format, the second query format distinct from the first query format. The method additionally includes utilizing, by the object search machine, the protocol query to request at least one object associated with the protocol query from the data storage system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 3 is a graphical representation of search results received by the object search machine in response to execution of a protocol query.

FIG. 4 is an example persistence query for use in conjunction with the object search machine of FIG. 1.

FIG. 5 is an example of a first portion of the persistence query of FIG. 4.

FIG. 6 is an example of a second portion of the persistence query of FIG. 4.

FIG. 7 is an example protocol query for use in conjunction with the object search system of FIG. 1.

DETAILED DESCRIPTION

An improved object searching technique relates to saving object search requests in a format that allows information of the object search requests to be used quickly and efficiently in future object searches. For example, an object search machine can receive a set of parameters that describe the characteristics of objects to be searched. The object search machine can then save this set of parameters using a format that stores each parameter as a separate entity. Every time an object search that is the same as or similar to an object search described by the stored set of parameters is to be conducted, the object search machine recalls the set of parameters without the need for manually reentering of parameters. Since the object search machine stores each parameter as a separate entity, the object search machine can quickly and efficiently populate its parameter fields with this data. The object search machine can then execute the object search by forwarding the search request to the data storage system in a different format (i.e., a format that is required by the data storage system).

Figure 1:
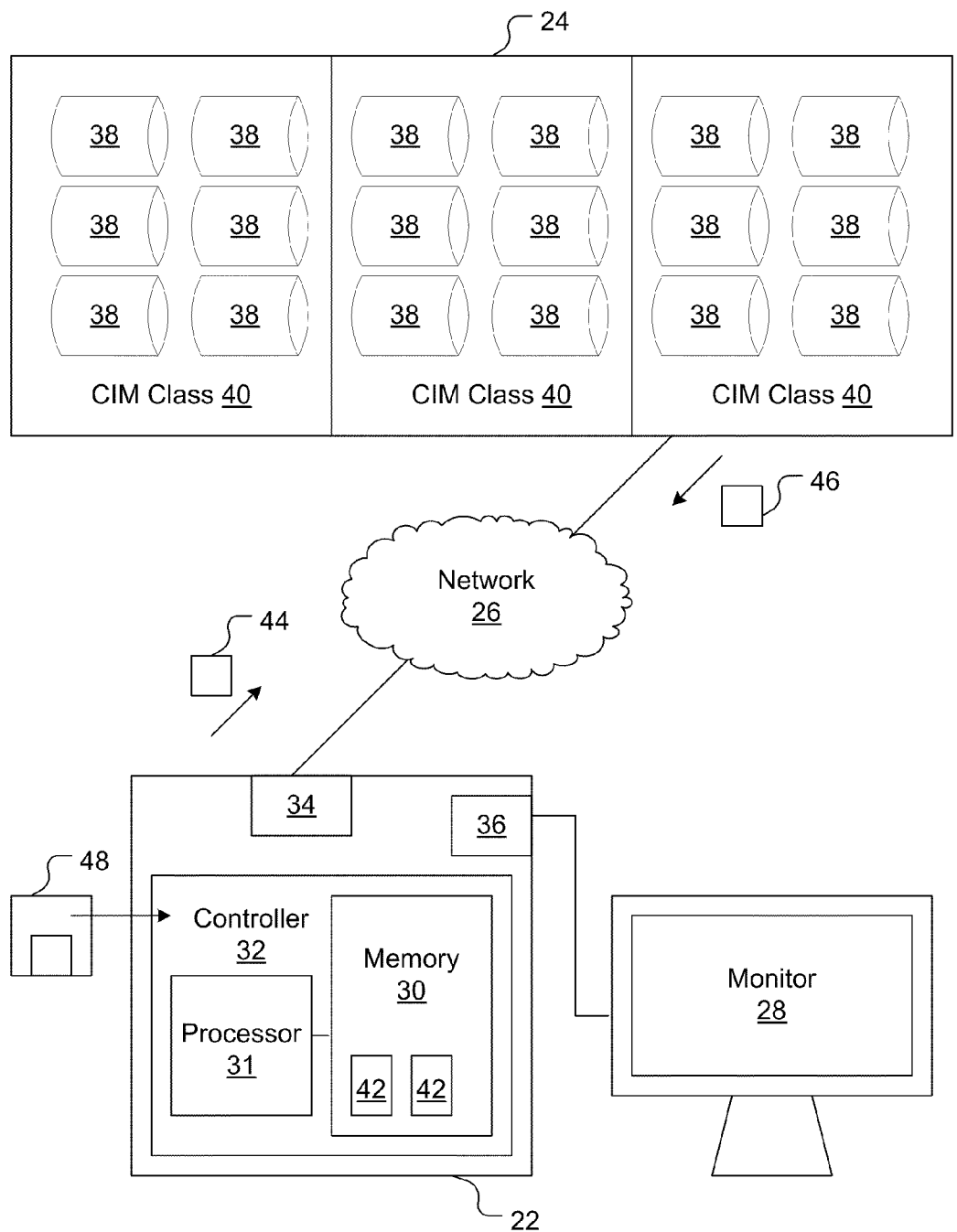
FIG. 1 illustrates a schematic representation of a data system having an object search machine.

FIG. 1 shows an object search system 20 that includes an object search machine 22 and a data storage system 24 disposed in electrical communication with each other. In one arrangement, a network 26, such as the Internet or a local area network, provides electrical communication between the object search machine 22 and the data storage system 24.

The data storage system 24, in one arrangement, is configured as a set of disk enclosures where each of the disk enclosures includes an array of magnetic memory units or disk drives. The data storage system 24 also includes one or more storage processors configured to perform load and store operations on the disk drives on behalf of a client device. The data storage system 24 is configured to store a plurality of objects 38 (e.g., one or more objects 38) where an object 38 is a representation of a logical or a physical location of data in the data storage system 24. Any object 38 in the data storage system 24 may be categorized into a CIM class 40. The CIM class 40 is the type of element that any given object represents. Examples of the CIM class 40 include: subsystem, host, folder, logical unit number (LUN), disks, fans, link control cards (LCCs), power supply, storage processor, RAID group, storage group, clone, mirror, snapshot, snapview session, and sancopy.

The object search machine 22 is configured to save object search requests for objects 38 of the data storage system 24. The object search machine 22 stores the object search requests in a format that allows information of the object search requests to be used quickly and efficiently in future object searches. The object search device 22, such as a computerized device, includes a network interface 34 and a user interface 36. The network interface 34 electrically couples the object search machine 22 to the network 26. The user interface 36, electrically couples the object search machine 22 to an output device, such as a monitor 28. The object search machine 22 also includes a controller 32, such as a memory 30 and a processor 31. In one arrangement, the controller 32 stores an object search application. The object search application installs on the object search machine 22 from a computer program product 48. In some arrangements, the computer program product 48 is available in a standard off-the-shelf form such as a shrink wrap package (e.g., CD-ROMs, diskettes, tapes, etc.). In other arrangements, the computer program product 48 is available in a different form, such downloadable online media. When performed on the controller of the object search machine 22, the object search application causes the object search machine 22 to save object search requests for objects 38 of the data storage system 24.

In use, the object search machine 22 allows a user to define and store an object search request as a persistence query 42 and recall the stored search request to be used in creating a protocol query 44 to retrieve objects 38 from the data storage system 24. For example, as will be described in detail below, the object search machine 22 displays a graphical user interface (GUI) to a user. The user utilizes the GUI to define an object search. In one arrangement; the user can save the defined object search by having the controller 32 generate a persistence query 42 that is stored in the memory 30 for use in future object searches. For example, after a user has defined a particular object search, the object search machine 22 stores the various parameters client has input as a file (i.e., as the persistence query 42) locally in memory 30. While the persistence query can be stored in a variety of formats, in one arrangement, the object search machine 22 stores the persistence query 42 in a first query format that allows the user-selected parameters to be quickly accessible and useable by the object search machine 22 when a user wishes to load the previously saved object search.

Furthermore, the object search machine 22 is configured to execute the object search request and generate the protocol query 44 forwarded to the data storage system 24. For example, after a user has input the various parameters that define a particular object search or has loaded a previously saved object search, the object search machine 22 executes the search by creating the protocol query 44. The protocol query 44 is created in a second query format that allows the parameters that the user has defined his search with to be in a form that is recognizable and actionable by the data storage system 24. Upon receiving the protocol query 44, the data storage system 24 conducts the requested search and generates search results 46. The data storage system 24 forwards the search results 46 across the network 26 to the object search machine 22. The object search machine 22 displays the search results 46 on the monitor 28 for the user to observe. For example, the search results 46 are presented on the monitor 28 as a table.

Figure 2:
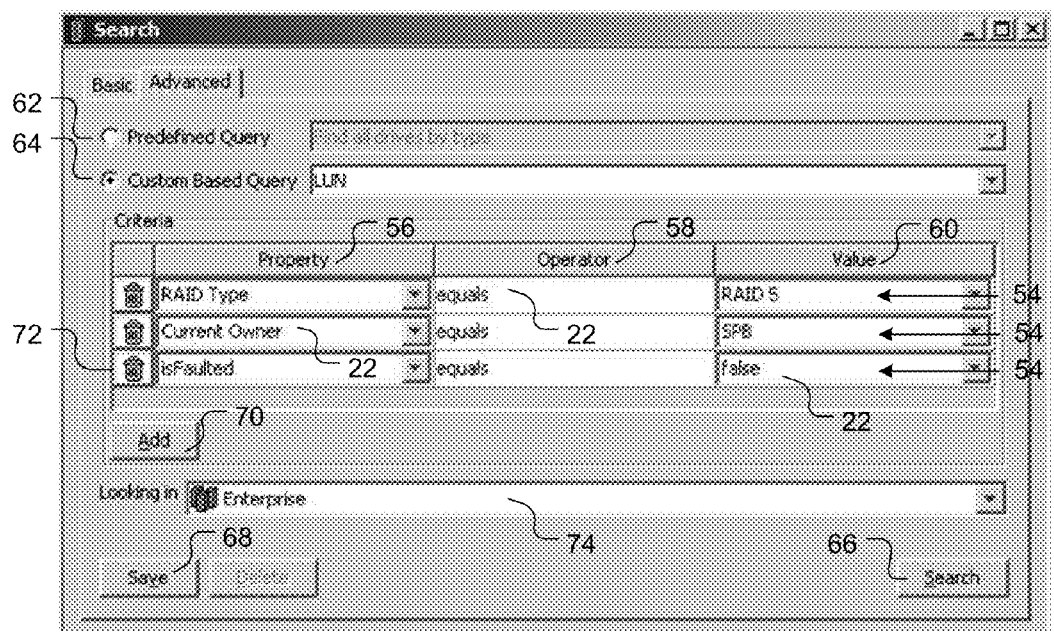
FIG. 2 is a graphical user interface provided by the object search machine of FIG. 1 during a persistence query generation procedure.

As indicated above, the object search machine 22 allows a user to define and store a persistence query 42 or execute a search by creating a protocol query 44. FIG. 2 illustrates an example of a GUI provided by the object search machine 22 during a persistence query generation procedure. The GUI includes search criteria 50 containing a set of parameters 52 (e.g., one or more parameters 52) which allows a user to define how a search of objects 38 in the data storage system 24 should be conducted. The GUI also includes a choice between working with a predefined query 62 and a custom based query 64. Additionally, the GUI includes a location election 74 that can limit scope of the object 38 search (e.g., which domain(s), array(s), etc. to search).

The search criteria 50 allow a user to input a set of selection criteria 54 (e.g., one or more selection criteria 54). Each selection criteria 54 contains three (3) different parameters 52. Specifically these parameters 52 include a characteristic property parameter 56, an operator parameter 58, and a value parameter 60. As seen in the example of FIG. 2, the first selection criteria 54 indicates a selection to search for LUNs that belong to arrays with a RAID type of RAID 5. This selection is represented by the characteristic property parameter 56 of "RAID type," the operator parameter 58 of "equals," and the value parameter 60 of "RAID 5."

The characteristic property parameter 56 indicates a specific characteristic of an object 38. Example characteristic property parameters 56 include: Name, ModelNumber-AsString, Id, NumberOfConnectedEVServers, NumberOf-LUNs, Number of SLUs, HostName, IP Address, Number-OfManagedSubsystems, HostID, Folder Type, RAIDType, HasActiveSnapSessions, Capacity, CurrentSpeed, isFaulted, DiskState, RGFreeSpace, NumberOfDisks, RAIDGroupID, NumberofFLUs, WWName, SessionName, and UserName. These characteristic property parameters 56 are provided as example parameters only and other characteristic property parameters 56 are possible. Certain characteristic property parameters 56 can describe objects 38 of certain CIM classes 40 but may be meaningless to other CIM classes 40. For example, Name, ModelNumberAsString, Id, NumberOfConnectedEVServers, NumberOfLUNs, and Number of SLUs, are possible characteristic property parameters 56 for a subsystem while WWN, RAIDType, Name, and HasActive-SnapSessions are possible characteristic property parameters 56 for a LUN. It should be noted that the characteristic property parameters 56 WWN and Name can apply to both subsystems and LUNs while NumberOfLUNs only applies to subsystems.

The operator parameter 58 indicates an operation that acts on the characteristic property parameter 56. Example operator parameters include: equal to (=), less than (<), greater than (>), less than or equal to (<=), greater than or equal to (>=), not equal to (!=), and LIKE. The LIKE operator parameter 58 is used when the characteristic parameter 56 and the value parameter 60 are both strings and compares the strings by pattern matching.

The value parameter 60 establishes a bound for the operator parameter 58 to act on the characteristic property 56. The value parameter 60 can be in various forms depending on what the corresponding characteristic property is. Example value parameters 60 include integers (e.g., 1, 50, 543, etc.), Booleans (e.g., true, false), and strings (e.g., RAID 5, building alpha, etc.).

New selection criteria 54 can be added to the search criteria 50 by activating an add selection 70, and existing selection criteria 54 can be removed from the search criteria by activating a delete selection 72. The search criteria can be saved by having the controller 32 generate the persistence query 42 (as seen in FIG. 1) to be stored on the memory 30 by activating a search save 68. The search criteria can be executed by having the controller 32 generate the protocol query 44 (as seen in FIG. 1) to be forwarded to the data storage system 24 by activating a search execute 66.

When interacting with the object search machine 22, the user has the capability of creating a new custom based query 64, retrieving a predefined query 62 or a previously created custom based query 64, modifying a predefined query 62 or a previously created custom based query 64, saving a newly created custom based query 64, a modified predefined query 62, or a modified previously created custom based query 64, and executing any of the above described queries.

Predefined queries 62 include commonly used search criteria 50 that are provided with the object search machine 22 and do not need to be initially created by the user. The predefined queries 62 are each identified by a different name. If the user wishes to modify the search criteria of one of the predefined queries 62 and save the changes, the object search machine 22, in one embodiment, requires that the modified query be saved under a new name that is different than the names of any of the predefined queries 62 or the custom based queries 64 to ensure that all of the predefined queries 62 are always available to the user in their original form.

Custom based queries 64 are created from scratch by the user. The custom based queries 64 are each identified by a different name. Upon being saved as one of the persistence queries 42 on the memory 30, the object search machine 22 can recall custom based queries 64 at any time to display its stored search criteria 50. If the user wishes to modify the search criteria 50 of the saved custom based query 64, the user can choose to not change the name (i.e., which results in the persistence query 42 being overwritten with the modifications), or the user can choose to give the custom based query 64 a new name (i.e., which creates a new persistence query 42 in addition to the older one).

In one embodiment, only the custom based queries 64 created by a specific user on the object search machine 22 are visible to that user. For example, a first user creates custom based queries 64 A, B, and C and a second user creates custom based queries D, E, and F. When the first user logs onto the object search machine 22, only queries A, B, and C (and not D, E, and F) are selectable as custom based queries 64. Likewise, when the second user logs onto the object search machine 22, only queries D, E, and F (and not A, B, and C) are selectable as custom based queries 64. This feature allows every user to quickly access their own custom based queries 64 with out having to sort through other user's queries. This feature can be accomplished, for example, by storing the persistence query 42 generated when a user saves a custom based query 64 in a user specific folder on the memory 30 that is separate from other folders specific to other users. However, there are multiple other ways of accomplishing this feature. Additionally, users may wish to share their custom based queries 64 with each other. For example, the first user may wish to share the query B with the second user by copying the persistence query 42 representing query B from the first user's folder on the memory 30 and placing it in the second user's folder on the memory 30.

In another embodiment, some or all of the custom based queries 64 created by a specific user on the object search machine are visible to multiple users. For example, a first user creates custom based queries 64 A, B, and C and intends query C to be commonly available to other users. Additionally a second user creates custom based queries 64 D, E, and F and intends query F to be commonly available to other users. When the first user logs onto the object search machine 22, only queries A, B, C, and F (and not D and E) are selectable as custom based queries 64. Likewise, when the second user logs onto the object search machine 22, only queries C, D, E, and F (and not A and B) are selectable as custom based queries 64. This feature can be accomplished, for example, by storing the some or all of the persistence queries 42 generated when a user saves custom based queries 64 in a common folder on the memory 30. Alternately, this feature can be accomplished, for example, by storing the some or all of the persistence queries in a common folder on the data storage system 24.

As indicated above, the object search machine 22 stores the persistence query 42 in a first query format. FIG. 4 shows an example format of a persistence query 42 configured in an eXtensible Markup Language (XML) file format. The persistence query 42 contains a persistence header portion 90, a persistence central query portion 92, and a persistence footer portion 94. The persistence central query portion 92 includes introductory and closing statements surrounding a list of separately tagged parameters 96, each of the list of separately tagged parameters 96 corresponds to each of the set of parameters 52 of the search criteria 50. It is because each of the set of parameters 52 of the search criteria 50 is listed as separately tagged parameters 96 (as opposed to a single tagged statement) that the persistence query 42 is said to be in the first query format. The list of separately tagged parameters 96 are grouped into a persistence SELECT region 98, a persistence FROM region 100, and a persistence WHERE region 102. The persistence FROM region 100 defines the CIM classes 40 of the data storage system 24 that are the subjects of search. The persistence WHERE region 102 defines which particular objects 38 satisfies the conditions of a search. The persistence SELECT region 98 indicates the properties of the matching objects 38 that are to be returned to the object search machine 22 in tabular format.

By storing the persistence query 42 in the first query format, the object search machine 22 can readily populate the parameters 52 of search criteria 50, as illustrated in FIG. 2, because every parameter 52 corresponds to a specific separately tagged parameter 96. By contrast, the separately tagged parameters 96 were stored in a single tagged statement (such as would be required by the data storage system 24 to actually execute a search), the object search machine 22 would have to spend time and resources trying to determine what the parameters 52 of the search criteria 50 should be.

In the example of FIG. 4, separately tagged parameters 96 in the persistence FROM region 100 indicate that EV_LUN and EV_Subsystem CIM classes 40 that are the subjects of the search. Specifically, EV_LUN and EV_Subsystem are the types of objects 38 which are maintained by the data storage system 24 to represent LUN and Subsystem elements of the data storage system 24, respectively.

FIG. 5 shows an expanded view of the persistence WHERE region 102 as seen in FIG. 4. The persistence WHERE region 102 includes groupings of separately tagged parameters 96 that relate to a set of conditions. Each of the conditions include three (3) separately tagged parameters 96 that are indicative of one (1) characteristic property parameter 56, one (1) operator parameter 58, and one (1) value parameter 60. In this case, a first condition is EV_LUN.RAIDType='RAID 5' which is represented by the separately tagged parameters 96 indicating: the characteristic property parameter 56 for RAID type, the operator parameter 58 for equal to, and the value parameter 60 for RAID 5. This first condition serves to search for objects 38 that are LUNs that belong to arrays formatted in a RAID 5 configuration. A second condition is EV_LUN.CurrentOwner='SPB' which is represented by the separately tagged parameters 96 indicating: the characteristic property parameter 56 for Current Owner, the operator parameter 58 for equal to, and the value parameter 60 for SPB. This second condition serves to search for objects 38 that are LUNs that are currently under the ownership of SPB. A third condition is EV_LUN.IsFaulted=false which is represented by the separately tagged parameters 96 indicating: the characteristic property parameter 56 for is Faulted, the operator parameter 58 for equal to, and the value parameter 60 for false. This third condition serves to search for objects 38 that are LUNs that have not faulted and are operational.

FIG. 6 shows an expanded view of the persistence SELECT region 98 as seen in FIG. 4. The persistence SELECT region 98 indicates that the query results 46 returned by the data storage system 24 should have 9 columns, the columns respectively corresponding to (1) the path of each LUN (OBJECTPATH(EV_LUN))(it should be noted that this column is retrieved but not displayed as indicated by the tagged statement <display>false</display>), (2) the name of each LUN (EV LUN.Name), (3) the LUN ID of each LUN (EV_LUN.LUNNumber), (4) the RAID configuration of the array associated with each LUN (EV_LUN.RAIDType), (5) the capacity of each LUN (EV_LUN.Capacity), (6) the current owner of each LUN (EV_LUN.CurrentOwner), (7) the default owner of each LUN (EV_LUN.DefaultOwner), (8) the faulted status of each LUN (EV_LUN.IsFaulted), and (9) the name subsystem associated with each LUN (EV_Subsystem.Name).

Figure 3:
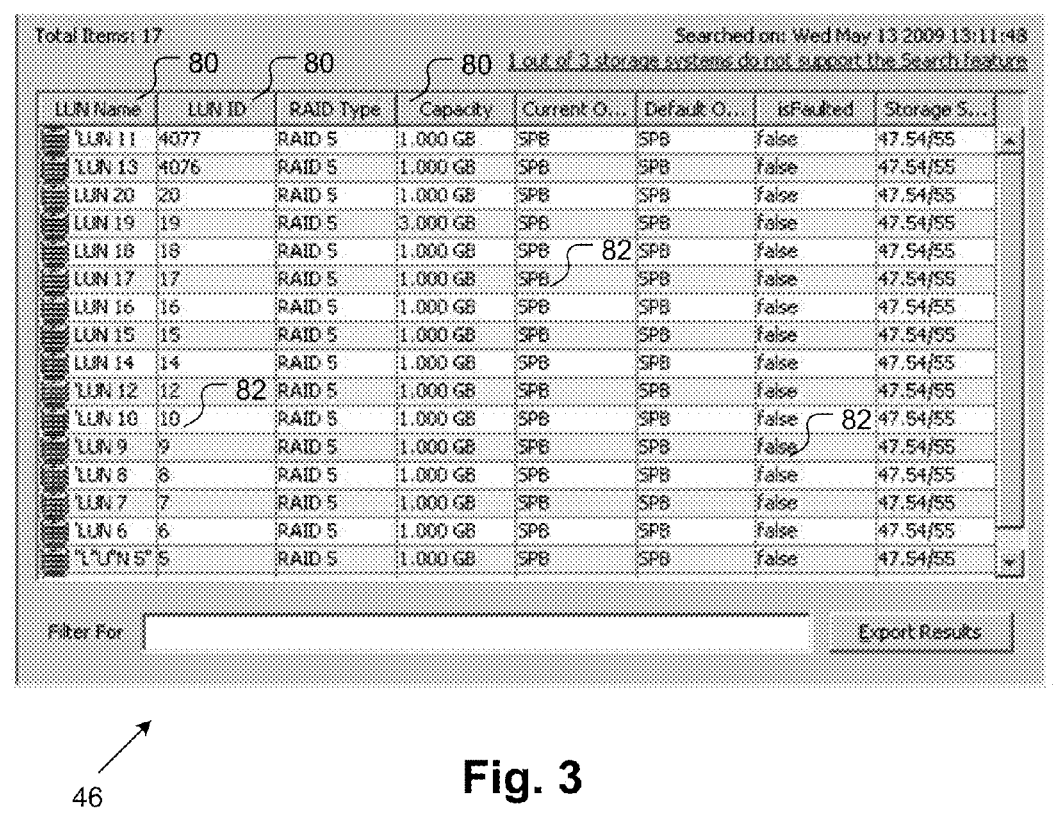

As indicated above, the object search machine 22 is configured to execute the search request to generate a protocol query 44. This is done, for example, by activating the execute search 66 as seen in FIG. 2. FIG. 3 is a graphical representation of search results received by the object search machine 22 in response to execution of a protocol query. The GUI includes search results 46 received from the data storage system 24 (see FIG. 1) containing a set of objects 38 (e.g., one or more objects 38) that fulfill the requirements of the corresponding object 38 search performed in the data storage system 24. The search results 46 include a set of characteristic property titles 80 (e.g., one or more characteristic property titles 80) and a set of characteristic property values 82 (e.g., one or more characteristic property values 82).

In the example of FIG. 3, the object search machine 22 displays the search results 46 that fulfill the requirements of the search criteria 50 (as shown in FIG. 2). The first object 38 that fulfills the search criteria 50 has a characteristic property value 82 of TUN 11 for the characteristic property title 80 of LUN Name. Additionally the first object 38 has a characteristic property value 82 of 4077 for the characteristic property title 80 of LUN ID. Each object 38 is depicted as having an individual characteristic property value 82 for each given characteristic property title 80.

As indicated above, the object search machine 22 generates the protocol query 44 in a second query format. FIG. 7 shows a protocol query 44 in an example protocol query format.

The protocol query 44, in one embodiment, is an XML file in a second query format. For example, in one arrangement, the protocol query 44 is configured as an XML file stored in memory 30. Alternately, the protocol query 44 can be stored in memory 30 as the second query format in a non-file format. The protocol query 44 contains a protocol header portion 104, a persistence central query portion 106, and a persistence footer portion 108. The protocol central query portion 106 includes introductory and closing statements surrounding a CQL statement 110 which defines the criteria of the protocol query 44. The CQL statement 110 contains the information stored in all of the list of separately tagged parameters 96 of the protocol query 42 and thus all of the set of parameters 52 in the search criteria 50. The CQL statement 110 is written in the CQL language. It is because all of the set of parameters 52 of the search criteria 50 is contained in a single tagged statement that does not contain any other embedded tagged statements within it (as opposed to being listed separately tagged parameters) that the protocol query 44 is said to be in the second query format. The CQL statement 110 contains a protocol SELECT statement 112, a protocol FROM statement 114, and a protocol WHERE statement 116. The protocol FROM statement 114 defines what CIM classes 40 of the data storage 24 system are the subjects of search. The protocol WHERE statement 116 defines which particular objects satisfies the conditions of a search. The protocol SELECT statement 112 indicates which properties of the matching objects are to be returned to the object search machine 22 in tabular format.

The protocol query 44 is configured in the second query format to ensure compatibility with the data storage system 24. The data storage system 24 expects to receive searches in the form of the CQL statement 110 and thus if the selection criteria 50 are stored in any other way (such as with the first query format used in the persistence query) the data storage system 24 will not produce search results 46.

The information stored in the protocol SELECT statement 112 corresponds to the information stored in the persistence SELECT region 98 of the persistence query 42. Likewise, the information stored in the protocol FROM statement 114 corresponds to the information stored in the persistence FROM region 100 of the persistence query 42 and the information stored in the protocol WHERE statement 116 corresponds to the information stored in the persistence WHERE region 102 of the persistence query 42.

Figure 8:
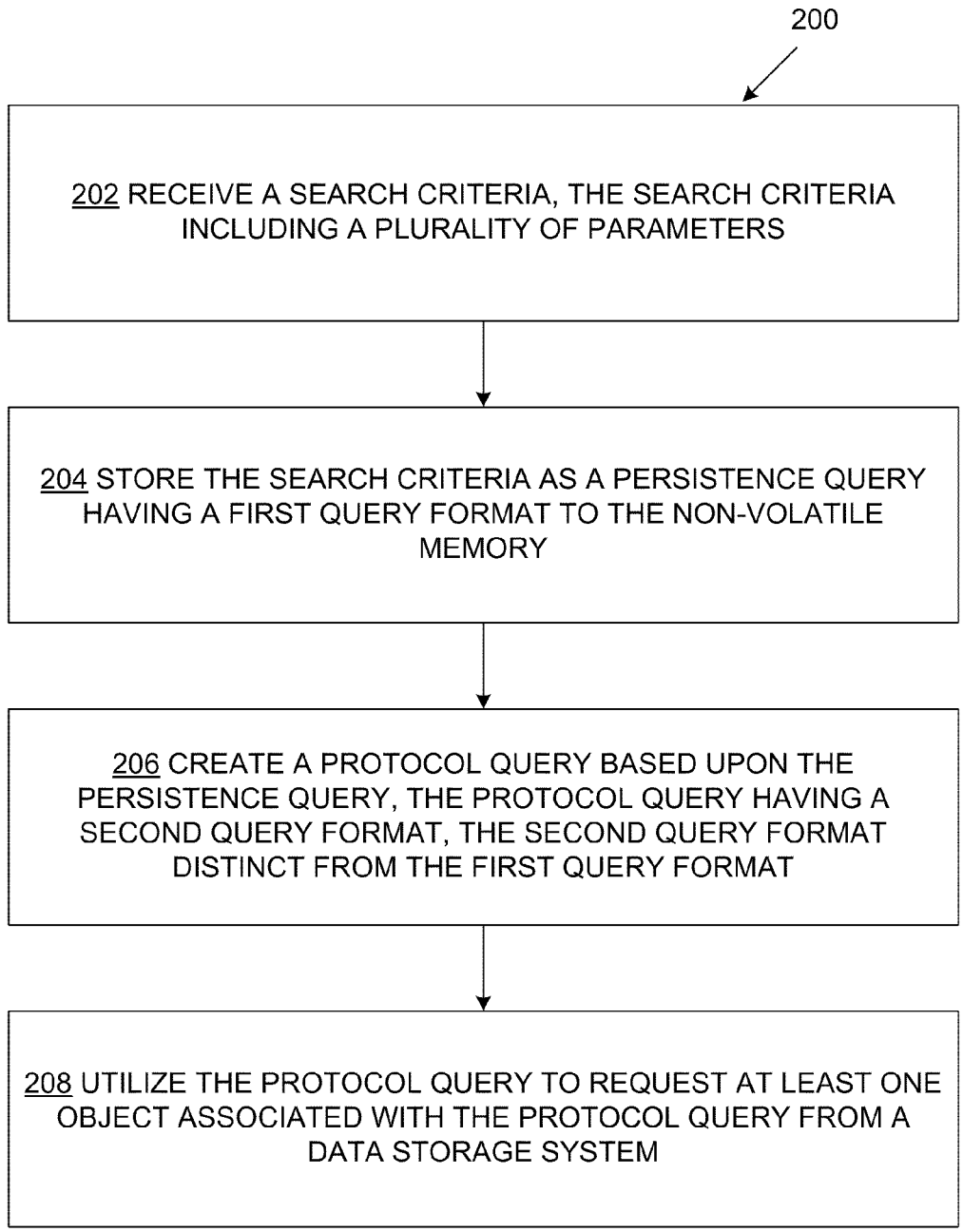
FIG. 8 is a flowchart that illustrates a procedure performed by the object search machine of FIG. 1.

FIG. 8 is a flowchart that illustrates an example procedure 200 performed by the object search machine 22 to perform an object search.

In step 202, the object search machine 22 receives the search criteria 50, the search criteria 50 including a plurality of parameters 52. In one embodiment, a user enters various parameters 50 into the object search machine 22 via a GUI.

In step 204, the object search machine 22 stores the search criteria 50 as a persistence query 42 having a first query format to the non-volatile memory. In one embodiment, the user clicks on the search save 68 (as seen in FIG. 2) which activates the object search machine 22 to generate a first XML file (as seen in FIG. 4) that includes each of the parameters 52 of the search criteria 50 as separately tagged parameters 96. The first XML file is stored on the memory 30.

In step 206, the object search machine 22 creates a protocol query 44 based upon the persistence query 42, the protocol query 44 having a second query format, the second query format distinct from the first query format. In one embodiment, the user recalls a saved object search by selecting the persistence query 42 as a custom based query 64 (as seen in FIG. 2). The user then clicks the execute search 66 which activates the object search machine 22 to generate a second XML file (as seen in FIG. 7) that includes all of the parameters 52 of the search criteria 50 (which were populated by the separately tagged parameters 96 of the first XML file) as a CQL statement 110 written as a single tagged statement.

In step 208, the object search machine utilizes the protocol query 44 to request at least one object 38 associated with the protocol query 44 from a data storage system 24. In one embodiment, upon receiving the protocol query 44, the data storage system 24 conducts a search as defined by the CQL statement 110 and returns search results 46 to the object search machine 22 which are displayed on the monitor 30 as a table (as seen in FIG. 3). It should be noted that while the object search machine 22 utilizes the protocol query 44 to request at least one object 38 from the data storage system 24, the data storage system may not have any objects 38 that are associated with the protocol query 44. In this situation, the search results 46 would reflect that no matching objects 36 are found.

While various embodiments of the invention have been particularly shown and described, it will be understood by those skilled in the art that various changes in form and details may be made therein without departing from the spirit and scope of the invention as defined by the appended claims.

For example, the object search GUI depicted in FIG. 2 does not show the capability of selecting which characteristic property titles 80 are displayed in the search results 46, however one skilled in the art could easily modify the object search machine 22 to include this capability. Additionally, the object search GUI depicted in FIG. 3 does not show the capability of creating joins between different CIS Classes 40, however one skilled in the art could easily modify the object search machine 22 to include this capability. Additionally, the object search system 20 is described as having the persistence queries 42 stored on the memory 30 of the object search machine 22, however one skilled in the art could easily store some or all of the persistence queries 42 in a different location, such as on a separate server.

What is claimed is:

1. A method of object searching in a data storage system, comprising:
    receiving, by an object search machine, a search criteria, the search criteria including a plurality of parameters;
    storing, by the object search machine, the search criteria as a persistence query having a first query format;
    creating, by the object search machine, a protocol query based upon the persistence query, the protocol query having a second query format, the second query format distinct from the first query format; and
    utilizing, by the object search machine, the protocol query to request at least one object associated with the protocol query from the data storage system,
    wherein storing, by the object search machine, the search criteria as a persistence query having a first query format includes:
    generating, by the object search machine, a first Extensible Markup Language (XML) file that includes each of the plurality of parameters as a separate tagged parameter; and
    storing, by the object search machine, the first XML file as the persistence query having the first query format, and
    wherein creating the protocol query based upon the persistence query includes:
    generating, by the object search machine, a second XML file that includes the plurality of parameters in a string in a single tagged statement, the single tagged statement being free of embedded tagged statements; and
    forwarding the second XML file to the data storage system.

2. The method of claim 1, wherein receiving, by the object search machine, the search criteria includes:
    receiving, by the object search machine, a characteristic property parameter of the at least one object to be searched;
    receiving, by the object search machine, an operator parameter to act on the characteristic property parameter; and
    receiving, by the object search machine, a value parameter to establish a bound for the operator parameter to act on the characteristic property parameter.

3. The method of claim 2:
    wherein receiving, by the object search machine, the search criteria includes receiving at least one selection criteria, each of the at least one selection criteria including one characteristic property parameter, one operator parameter, and one value parameter; and
    further comprising receiving a modification of the search criteria, the modification including at least one of added, deleted, and replaced selection criteria of the search criteria.

4. The method of claim 3, further comprising, storing, by the object search machine, the modified search criteria as a second persistence query having the first query format.

5. The method of claim 1, wherein the string in the single tagged element is written in Common Information Model (CIM) query language (CQL).

6. The method of claim 1:
    wherein the object search machine is configured to be logged onto by a first user and a second user;
    wherein receiving, by the object search machine, the search criteria includes receiving, by the object search machine, the search criteria that is created by the first user; and
    further comprising restricting, by the object search machine, visibility of the persistence query to the first user.

7. The method of claim 1, wherein the at least one object is one of a logical location of data and a physical location of data in the data storage system.

8. The method of claim 1:
    wherein data stored in the data storage system is divided into a plurality of CIM classes; and
    further comprising storing in the persistence query and the protocol query a selection of the plurality of CIM classes to be searched.

9. The method of claim 1, wherein the search criteria refer to data objects of a Common Information Model (CIM) of the data storage system, and wherein the method further comprises:
    accessing the persistence query;
    displaying the search criteria stored in the persistence query;
    accepting changes to some but not all of the displayed search criteria;
    storing the search criteria including the changes as a second persistence query;
    creating a second protocol query from the second persistence query; and
    transmitting the second protocol query to the data storage system to request information about at least one data object of the CIM.

10. The method of claim 9, wherein the plurality of parameters stored in the first persistence query includes at least one of a RAIDType parameter to identify a RAID type, a NumberOfLUNs parameter to identify a number of logical unit numbers, a DiskState parameter to specify a state of a disk, and a NumberOfDisks parameter to specify a number of disks.

11. The method of claim 1, wherein the persistence query specifies each of the plurality of parameters within a respective pair of XML tags, and wherein the protocol query specifies all of the plurality of parameters in a single CIM Query Language (CQL) statement.

12. The method of claim 11, wherein each of the persistence query and the protocol query includes a list of object properties of the CIM to be displayed.

13. An object search machine comprising:
a non-volatile memory; and
processing circuitry disposed in electrical communication with the non-volatile memory, the processing circuitry constructed and arranged to:
receive a search criteria, the search criteria including a plurality of parameters,
store the search criteria as a persistence query having a first query format to the non-volatile memory,
create a protocol query based upon the persistence query, the protocol query having a second query format, the second query format distinct from the first query format,
utilize the protocol query to request at least one object associated with the protocol query from a data storage system,
store the search criteria as a persistence query having a first query format by being constructed and arranged to:
generate a first Extensible Markup Language (XML) file that includes each of the plurality of parameters as a separate tagged parameter; and
store the first XML file as the persistence query having the first query format,
and
create the protocol query based upon the persistence query by being constructed and arranged to:
generate a second XML file that includes the plurality of parameters in a string in a single tagged statement, the single tagged statement being free of embedded tagged statements; and
forward the second XML file to the data storage system.

14. The object search machine of claim 13, wherein the processing circuitry is constructed and arranged to receive the search criteria by being constructed and arranged to:
receive a characteristic property parameter of the at least one object to be searched;
receive an operator parameter to act on the characteristic property parameter; and
receive a value parameter to establish a bound for the operator parameter to act on the characteristic property parameter.

15. The object search machine of claim 14:
wherein the search criteria includes at least one selection criteria, each of the at least one selection criteria including one characteristic property parameter, one operator parameter, and one value parameter; and
wherein the processing circuitry is further constructed and arranged to (i) receive a modification of the search criteria, the modification including at least one of added, deleted, and replaced selection criteria of the search criteria, and (ii) store the modified search criteria as a second persistence query having the first query format.

16. The object search machine of claim 13, wherein the string in the single tagged element is written in Common Information Model (CIM) query language (CQL).

17. The object search machine of claim 13:
wherein the object search machine is configured to be logged onto by a first user and a second user;
wherein the search criteria is created by the first user; and
wherein the object search machine is further constructed and arranged to restrict visibility of the persistence query to the first user.

18. The object search machine of claim 13, wherein the at least one object is one of a logical location of data and a physical location of data in the data storage system.

19. The object search machine of claim 13:
wherein data stored in the data storage system is divided into a plurality of CIM classes; and
wherein the processing circuitry is further constructed and arranged to store in the persistence query and the protocol query a selection of the plurality of CIM classes are to be searched.

20. A computer program product having a non-transitory computer-readable medium including computer program logic encoded thereon that, when performed on an object search machine directs the computer system to perform the method of:
receiving, by the object search machine, a search criteria, the search criteria including a plurality of parameters;
storing, by the object search machine, the search criteria as a persistence query having a first query format;
creating, by the object search machine, a protocol query based upon the persistence query, the protocol query having a second query format, the second query format distinct from the first query format; and
utilizing, by the object search machine, the protocol query to request at least one object associated with the protocol query from the data storage system,
wherein storing, by the object search machine, the search criteria as a persistence query having a first query format includes:
generating, by the object search machine, a first Extensible Markup Language (XML) file that includes each of the plurality of parameters as a separate tagged parameter; and
storing, by the object search machine, the first XML file as the persistence query having the first query format, and
wherein creating the protocol query based upon the persistence query includes:
generating, by the object search machine, a second XML file that includes the plurality of parameters in a string in a single tagged statement, the single tagged statement being free of embedded tagged statements; and
forwarding the second XML file to the data storage system.

* * * * *